United States Patent [19]

Lampkin

[11] 4,414,252
[45] Nov. 8, 1983

[54] SPRAY FORMING THIN FILMS

[75] Inventor: Curtis M. Lampkin, El Paso, Tex.

[73] Assignee: Photon Power, Inc., El Paso, Tex.

[21] Appl. No.: 381,291

[22] Filed: May 24, 1982

Related U.S. Application Data

[63] Continuation of Ser. No. 209,724, Nov. 24, 1980, abandoned.

[51] Int. Cl.³ .............................. B05D 1/02; B05B 1/04
[52] U.S. Cl. ..................................... 427/424; 118/323; 118/326; 118/DIG. 7; 239/296; 239/299; 98/115 SB
[58] Field of Search ......... 118/315, 323, 326, DIG. 7; 427/424; 239/296, 299; 98/115 SB

[56] References Cited

U.S. PATENT DOCUMENTS

| | | | |
|---|---|---|---|
| 3,652,246 | 3/1972 | Michelotti et al. | 65/181 |
| 3,689,304 | 9/1972 | Bamford | 118/323 |
| 3,848,807 | 11/1974 | Partida | 239/269 |
| 3,880,633 | 4/1975 | Jordan | 65/60 |
| 3,885,066 | 5/1975 | Schwenninger | 427/314 |
| 3,887,349 | 6/1975 | Akashi et al. | 65/161 |
| 4,064,832 | 12/1977 | Chujo et al. | 118/323 |
| 4,125,391 | 11/1978 | Van Laethem | 118/49 |
| 4,224,355 | 9/1980 | Lampkin et al. | 427/8 |
| 4,239,809 | 12/1980 | Lampkin et al. | 427/74 |

FOREIGN PATENT DOCUMENTS 1400552 7/1975 United Kingdom .

Primary Examiner—Shrive P. Beck
Attorney, Agent, or Firm—Ray G. Wilson

[57] ABSTRACT

An improved spray booth is provided for use in forming high quality thin films by controlling the spray parameters related to film formation. A spray nozzle design is selected which permits control of the spray footprint on a heated substrate. A projected atomized liquid is formed to the selected spray configuration by directing spray cones of air toward the atomized liquid. Dwell time of the spray material adjacent the hot substrate is then controlled by controlling the velocity of airflow within the spray chamber and adjacent the substrate. To promote a gas phase reaction, a roof section is provided with reduced airflow wherein sufficient dwell time is provided for the vapor reaction to occur. Where a liquid phase reaction is provided, high velocity airflow is maintained to promptly remove reaction products and spray material which has not reached the surface after a selected time period. The spray booth is designed for frequent cleaning by providing separately removable sections where the frequency of cleaning may be varied as a function of the accumulated condensate. Thus, regions of the spray booth in contact with the sprayed solution may be removed without removing the entire spray booth. Particular uses employing the particular design principles include application of a film of $SnO_x$ which is highly transparent and electrically conductive and thin films of CdS suitable for use in forming large area photovoltaic panels.

25 Claims, 7 Drawing Figures

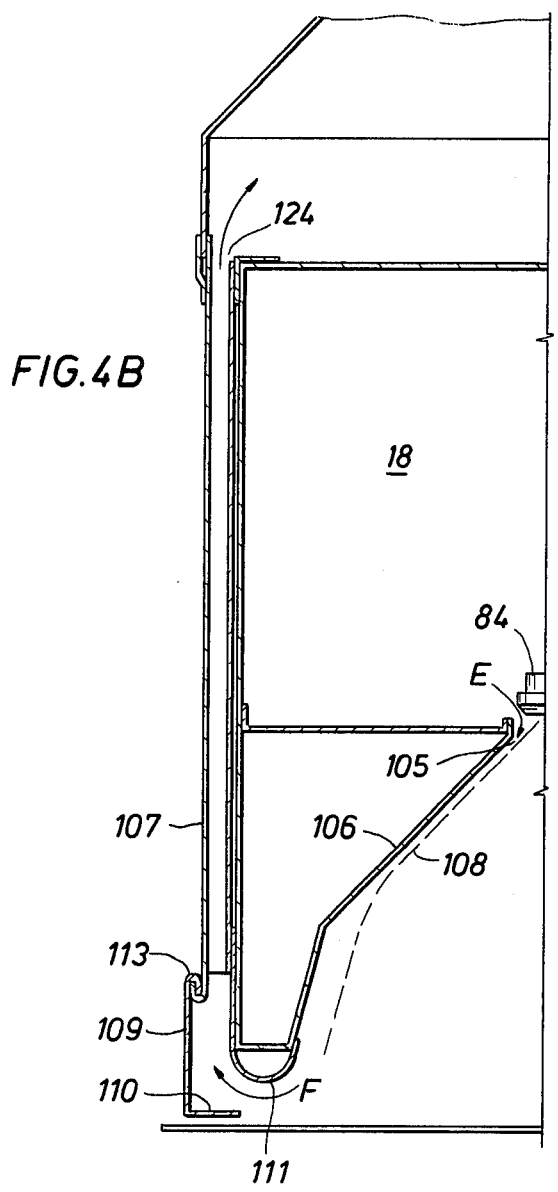
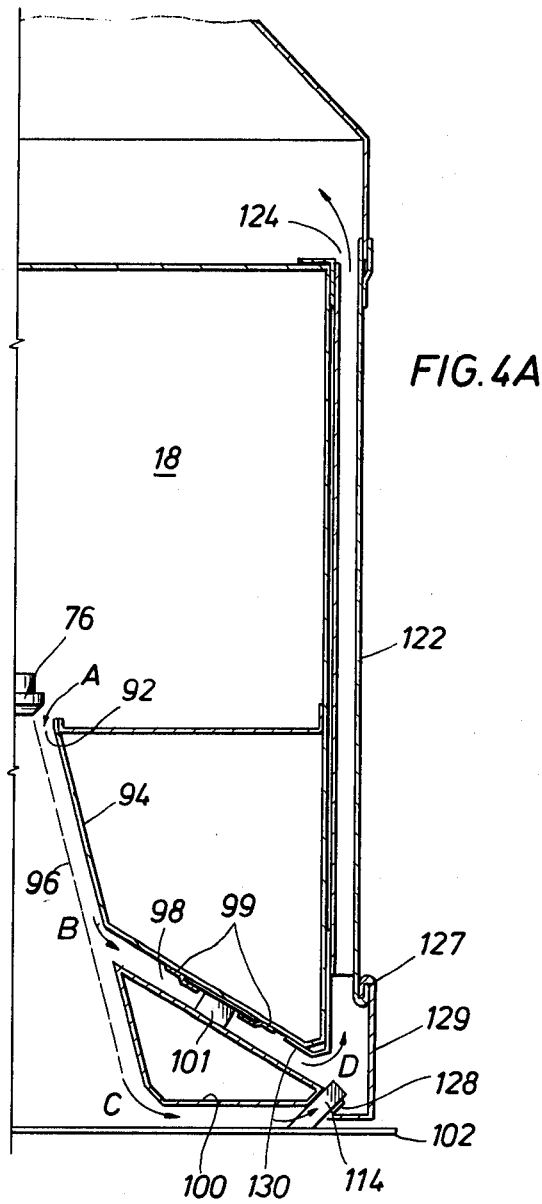
FIG.4B
FIG.4A
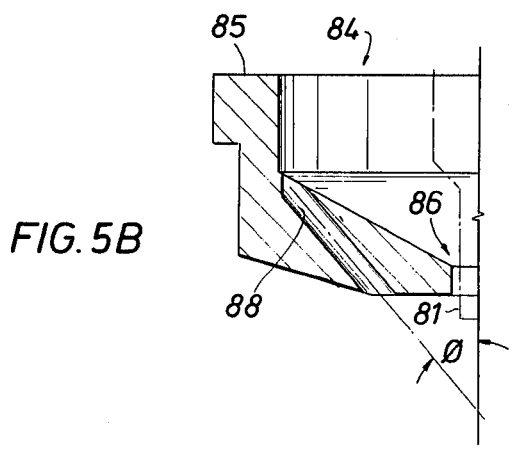
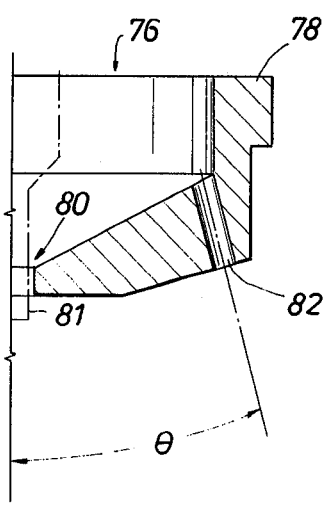
FIG.5B
FIG.5A

SPRAY FORMING THIN FILMS

This is a continuation of application Ser. No. 209,724, filed Nov. 24, 1980 and now abandoned.

FIELD OF INVENTION

This invention relates to thin film formation, and more particularly to improved methods and apparatus for forming thin films on vitreous substrates using a spray deposition process.

BACKGROUND OF THE INVENTION

Various technology related to forming thin films on substrate materials has been available for many years. However, recent product requirements have imposed demands which existing technology could not adequately satisfy. Ever increasing demand for high quality films, substantially free of pinhole-type defects, has occurred in the field of photovoltaics and of electrical display devices.

A major use of thin films in the prior art was coated glass for use in buildings. The coatings were applied to obtain a variety of colors for architectural purposes and for screening incident radiation. Such coatings required a degree of optical clarity and freedom from interference rings, but did not require a high degree of perfection with respect to pinhole defects. Electrically conductive coatings were applied to transparent substrates for some applications, e.g., cockpit windows in airplanes to provide for passing an electrical current for heating the window, where additives could be used to obtain the desired film characteristics, such as light transmission and electrical conductivity.

Recent developments in photovoltaics and in electrical displays have produced requirements for quantities of high quality films heretofore produced only for low volume speciality applications. These requirements are for thin films up to 4 microns in thickness formed on vitreous substrates, such as glass. Extremely thin films are required for optical purposes as well as for conservation of scarce materials.

In the prior art, such thin films have been formed by various techniques, including vacuum evaporation and deposition, vapor deposition, high frequency sputtering, and liquid sprays onto a heated substrate. The present application concerns only the application of liquid sprays onto a heated substrate, and more particularly, a substrate which is heated throughout the spray process.

The prior art is replete with attempts to obtain high quality film deposition using spray techniques. Spraying offers the potential of providing a high volume, low cost process which may be readily adapted to quantity production. However, spray application can produce a number of difficulties with respect to forming high quality films.

High quality film formation generally occurs when the sprayed materials maintain relatively similar time-temperature histories. Sprayed materials which reach the surface or a position adjacent the surface, which are relatively longer in transit, or which are deposited adjacent surface portions with relatively different temperatures form films having quite different characteristics than desired. Thus, it would be desirable to provide film-forming material adjacent the surface with controlled time-temperature histories and to confine deposition of that material to selected portions of the heated substrate.

One such attempt in the prior art is described in U.S. patent application Ser. No. 886,891 wherein the spray nozzle is tilted with respect to the vertical to confine the sprayed solution to a selected portion of the substrate and wherein various baffles are provided to shield the substrate in regions where the substrate temperature was not sufficiently controlled or where the accumulated time-temperature history of the particles produced unacceptable films. Thus, only a portion of the spray was selected for deposition on the surface.

Yet another technique is to provide exhaust ducts adjacent the spray nozzles for removing reaction products above the surface. Such device, by way of example, is depicted in U.S. Pat. No. 3,887,349 for forming metallic oxide coatings on a glass surface. Another approach disclosed in U.S. Pat. No. 4,125,391 is to project the spray at a relatively low angle of incidence with respect to the surface in the direction of substrate movement. Exhaust ducts are provided downstream from the spray to collect reaction products, but without affecting the spray prior to the spray impinging on the surface.

The prior art devices to attempt to remove reaction products from above the glass surface. There is, however, generally no control of the time-temperature history of the droplets other than gross removal afforded by the exhaust system. Thus, metallic oxide films are produced which are satisfactory for window glass, but are not satisfactory for high quality transparent electrically conductive films. Yet another prior art technique discussed in U.S. Pat. No. 3,880,633, is to produce a spray composed of uniformly sized drops. However, such a system is very difficult to obtain with an air atomized spray system. Even with uniform droplet sizes, a time-temperature history control is still desirable to maintain a product of uniform quality.

The disadvantages of the prior art are overcome by the present invention, however, and improved methods and apparatus for forming thin films by a spray deposition process are provided.

SUMMARY OF THE INVENTION

Improved method and apparatus are provided for forming high quality thin films of selected materials by spraying selected solutions toward a hot moving substrate. A contoured spray booth provides a minimum volume within which the spray is projected wherein spray-induced turbulence is greatly reduced or terminated. Ambient air introduction is provided for suppressing convection currents which may arise from the hot substrate. The overall reduction in internal spray booth turbulence produces a major improvement in film quality.

A spray nozzle design is selected which permits control of the spray "footprint" incident on the hot substrate. A projected atomized liquid is formed to the selected spray configuration by directing spray cones of air about the atomized liquid. In one embodiment, it is desired to substantially eliminate flow of the atomized liquid transverse to movement of the substrate and an air projection angle is selected which forms a substantially vertical air curtain. In another embodiment, a fan shaped spray configuration is obtained by projecting the air spray cones directly toward the atomized liquid. By selecting the longitudinal axis of the fan to be parallel with substrate movement, an increased volumetric rate of spray may be obtained without greatly increasing the unit heat loading on the substrate. By controlling movement of the spray along the substrate, improved uniformity of conditions for film formation is obtained.

Dwell time of the sprayed material adjacent the hot substrate is controlled by controlling the velocity of airflow within the spray chamber and adjacent the substrate. In a gas phase reaction, a roof section is provided for increasing spray deposition efficiency wherein airflow velocity beneath the roof is greatly reduced by removing air from within the spray chamber at a location along the spray chamber walls. In another embodiment, high quality films are formed within a short distance aboug the spray footprint on the substrate surface and a relatively high air velocity is maintained for removing materials which do not promptly react on the surface or which form reaction products from such a reaction. Spray chamber walls terminate adjacent the exhaust duct entrance and full velocity is maintained about the spray.

An exhaust duct system is designed to maintain substantially uniform atmospheric flow across the width of the moving substrate to minimize non-uniform film deposition. Exhaust uniformity is maintained over a variety of airflow and temperature conditions.

Various portions of the spray booth are separately removable to enhance cleanability without affecting substrate filming operations. An exhaust entrance assembly is easily removable from the spray booth to provide frequent cleaning where spray residue and reaction products condense as the airflow is accelerated from above the substrate and into the exhaust ducts. The exhaust ducts are separately removable from the spray booth and may be broken apart for interior cleaning. Lip portions overlie interior wall portions of the spray chamber where abrupt acceleration of air and spray products occur. Where a roof section is provided, the roof section is separately removable from the spray booth for cleaning. Thus, those portions of the spray booth which are in direct contact with the spray or with reaction products and where such materials are expected to accumulate are readily removable for cleaning.

The spray booth employing a substantially vertical air curtain, intermediate air slot, and roof section is particularly suitable for forming transparent and highly conductive films of $SnO_x$ on a glass substrate where substantial uniformity and optical clarity are maintained while low electrical resistivities are achieved without the use of dopants. The spray booth employing a fan shaped spray and maintaining a large atmospheric velocity for removing unreacted spray components and reaction products produces thin films of CdS with substantial freedom from pinhole defects and over large area substrates for use in producing photovoltaic panels on a production scale.

IN THE DRAWINGS

FIG. 4A is a schematic cross section of a spray booth suitable for forming tin oxide.

FIG. 4B is a schematic cross section of a spray booth suitable for forming cadmium sulfide.

FIG. 5A is a cross section of an air cap for a tin oxide spray nozzle.

FIG. 5B is a cross section of a spray nozzle air cap for cadmium sulfide.

DETAILED DESCRIPTION

Figure 1:
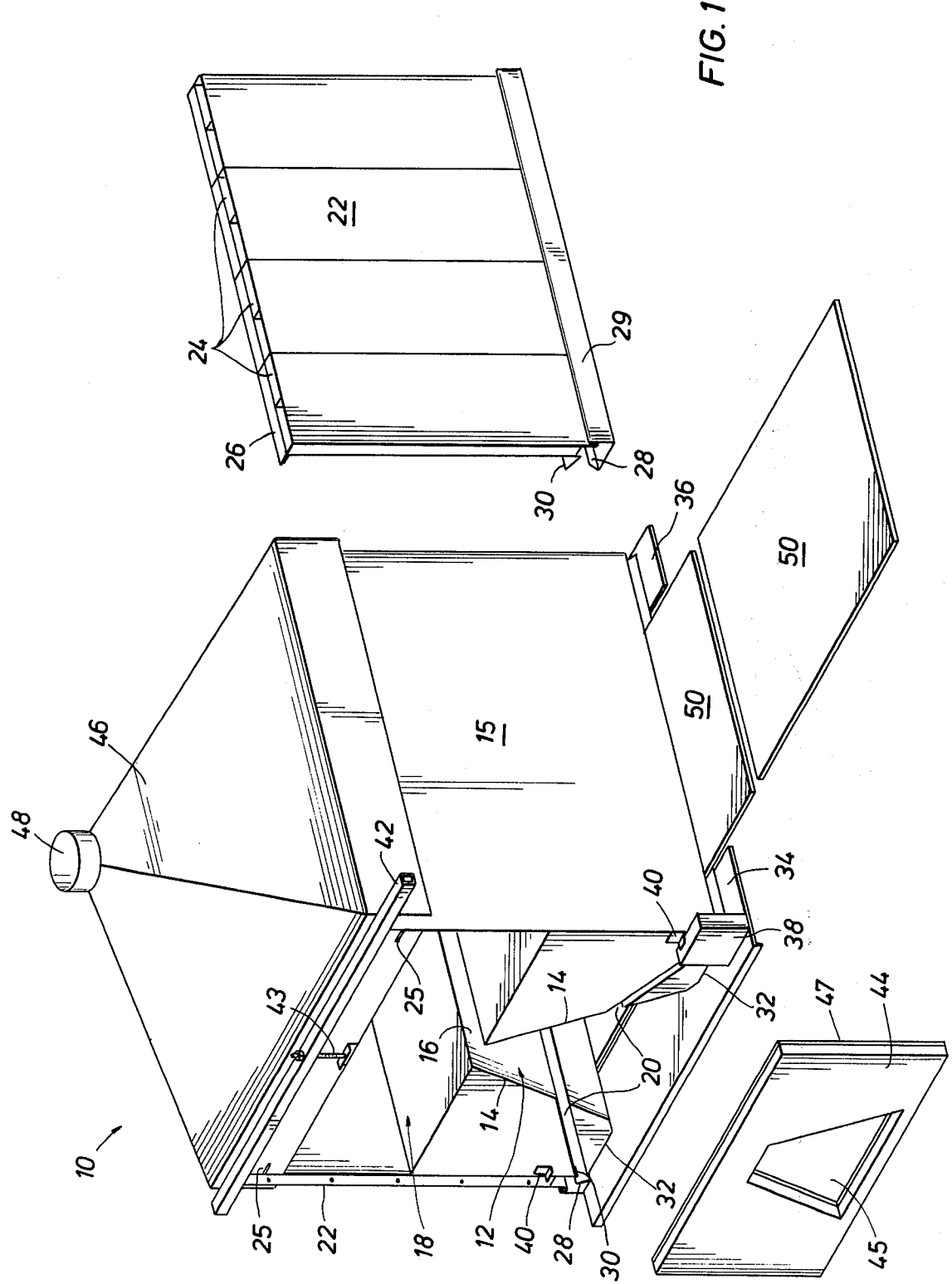
FIG. 1 is a simplified pictorial illustration of a spray booth embodying various concepts of the present invention.

Referring now to FIG. 1, there is depicted a pictorial illustration of a spray booth embodying many of the concepts of the present invention. Spray booth assembly 10 is provided generally incorporating spray chamber 12 defined by interior walls 14 and booth exterior walls 15. A spray entrance slot 16 is provided between adjacent interior wall portions 14 and beneath nozzle traverse space 18. Removable exhaust assemblies 22 are provided on the upstream and downstream portions of spray booth assembly 10. The exhaust hood 46 collects material from ducts 22 for dlivery to the external exhaust duct 48. Insulated side walls 44 are provided as hereinafter described.

Spray booth assembly 10 is generally located over a heated conveyor line (not shown) conveying substrate materials through spray booth 10. Spray booth 10 is particularly suited for use in spray depositing film forming materials on a heated substrate where the substrate is continuously heated through the spraying process. As herein described, glass sheets 50 are particularly suited for the film forming operations.

The particular heating and conveying system chosen for substrate 50 is not particularly critical to operation of spray booth 10 described herein. However, the best results are obtained where a heat input profile is generally matched to the heat loss profile within the spray booth 10 and where the exposed surface of substrate 50 is even with, or slightly above, any surface of the conveying mechanism. It is also desirable that the spacing between a leading or trailing edge of substrate 50 and an adjacent facing portion of the conveying system or an adjacent sheet of substrate 50 be maintained at $\frac{1}{8}''$ or less. This spacing assists in keeping the various chemical reactions adjacent the surface at the leading and trailing edges.

Spray booth exterior 15 is provided with support angles 40 which rest on support blocks 38 for holding booth assembly 10 above substrate 50. Support blocks 38 may be provided in a variety of sizes to insure a uniform controlled clearance of booth assembly 10 above substrate 50. Support blocks 38 may be provided with a resilient backing, such as a sheet of foam silicone, which is heat resistant and seals adjacent air passages from the booth 10 exterior environment. Booth exterior 15 may also be provided with an attachment mechanism 43 connecting with support beam 42. Support beam 42 may conveniently interconnect adjacent booths on an assembly line for enabling removal of support blocks 38 while maintaining booth assembly 10 in position. Attachment means 43 may conveniently be a threaded nut assembly for adjusting the elevation of booth assembly 10 onto support blocks 38.

Spray chamber 12 is defined by interior wall portions 14. Wall portions 14 are separated at the upper end by spray nozzle entrance slot 16 for admitting an incident spray, as hereinafter described. At least the upper portions of interior walls 14 may be insulated to maintain space 18 containing the spray traverse mechanism (FIGS. 2 and 3) at generally ambient conditions. Traverse mechanism space 18 is generally open at both ends for establishing atmospheric flow therethrough. This atmospheric flow may be created by an external exhaust fan which causes air to enter spray chamber 12 through spray entrance slot 16.

Spray chamber 12, as defined by interior walls 14, forms a minimum volume region for accommodating the configuration of the incident spray. The minimum volume configuration is an important feature of the present spray booth and assists in suppressing internal convection currents and spray turbulence.

Airflow control slots 20 may be provided where the flow which is introduced through spray entrance slot 16 is selected to be the amount needed to suppress internal convection currents but is in excess of the amount desired to promote film formation adjacent substrate 50. Airflow control slots 20 permit a portion of the incoming airflow to be removed above substrate 50 and returned to exhaust assembly 22.

The bottom portion of spray chamber 12 is configured to facilitate the particular chemical reaction forming the desired film on substrate 50. As depicted in FIG. 1, a roof assembly 32 is provided which is a suitable configuration where the film is formed from a gas phase reaction such as occurs in forming electrically conductive films of tin oxide ($SnO_x$). In other reactions, such as forming polycrystalline films of cadmium sulfide (CdS), roof assembly 32 would be undesirable since it is desired to remove the gaseous and spray products from above the surface after a certain minimum time.

Spray booth assembly 10 is generally wider than substrate 50. This increased width generally accommodates the width of the heaters in the heater section beneath substrate 50, but also accommodates end pans 34 and 36 on either side of substrate 50. As hereinafter discussed, spray nozzle movement is non-liner at the ends of the traverse over substrate 50. If this non-linearity occurred totally over substrate 50, a non-uniform film would be produced. Consequently, end pans 34 and 36 provide a region removed from substrate 50 for receiving at least part of the incident spray when the direction of travel of the spray nozzle can be reversed. The liquid flow through the spray nozzle may be shut off during the reverse cycle while atomizing airflow continues to prevent clogging of the nozzle. However, it is possible to continue normal spray operations throughout the entire cycle wherein the spray configurations hereinbelow described are maintained.

End panels 44 are provided at either side of spray booth assembly 10, covering the ends of spray chamber 12. End panel 44 is generally insulated to maintain the exterior portion at safe temperatures. End panel 44 also functions to seal the adjacent internal air passages of booth 10. Sealing material 47, which may be a temperature resistant material such as sheet foam silicone, is provided for abutting and sealing spray chamber 12, roof area 32, and air flow control slot 20. A view port 45 may conveniently be provided for observing the spray conditions and substrate 50 integrity within spray chamber 12.

FIG. 1 also shows removable exhaust ducts 22. The removability feature greatly improves the serviceability of the spray booth. Each exhaust assembly 22 generally includes exhaust lip 28 which acts to divert airflow from above substrate 50 into exhaust ducts 24. An angled surface may be provided for exhaust lip 28 to enhance this flow removal. Where airflow control slot 20 is provided, an air slot exhaust lip 30 may also be provided to facilitate booth cleaning.

Exhaust lips 30 and 28 are provided in regions where acceleration and cooling of the spray components are occurring and where spray deposition of residue of reaction products and undeposited spray materials is expected to occur within spray booth assembly 10. Exhaust lip 30 is removable with exhaust ducts 22 for cleaning. Exhaust lip 28 is formed on exhaust entrance assembly 29. It is expected that maximum residue will accumulate on assembly 29, and assembly 29 is conveniently removable separate from exhaust assembly 22 to provide for frequent cleaning.

Exhaust assembly 22 may be provided with a plurality of exhaust ducts 24. Providing a plurality of separate ducts 24 provides internal spacers to prevent temperature induced warping of exhaust ducts 22 and permits the flow areas forming the various exhaust ducts 24 to be varied, if necessary, to ensure uniform exhaust flow across the surface of substrate 50. Uniform exhaust flow is desirable to promote temperature uniformity of the substrate 50 and uniform distribution of film-forming materials to the surface of substrate 50.

Spray booth exterior assembly 15 may conveniently include support slot 25 which accepts exhaust assembly support lip 26. Support lip 26 engages slot 25 to facilitate removal and replacement of exhaust duct 22 on the spray booth exterior 15.

During operation of spray booth assembly 10, exhaust assemblies 22 may be quickly replaced. It is desirable that the replacement affect only a single substrate 50 within spray booth assembly 10. It is believed that exhaust assemblies 22 and exhaust entrance assemblies 29 will require cleaning relatively frequently compared with other portions of the spray booth and hence the design facilitates removal of exhaust assemblies 22 and exhaust entrance assemblies 29 for cleaning.

When it is desired to clean the entire spray booth assembly 10, support attachments 43 may be adjusted to raise the elevation of spray booth 10 above support blocks 38 wherein support blocks 38 may be removed. If desired, a cover sheet assembly (not shown) may then be inserted beneath spray booth assembly 10 and over substrate 50 during booth removal. Removal is completed by disengaging attachment 43 from support beam 42, removing portions of external exhaust ducting 48, and removing booth assembly from above the conveyor line 50. Cleaning may be accomplished by a variety of techniques, such as washing, sandblasting, brushing, or ultrasonic cleaning.

Figure 2:
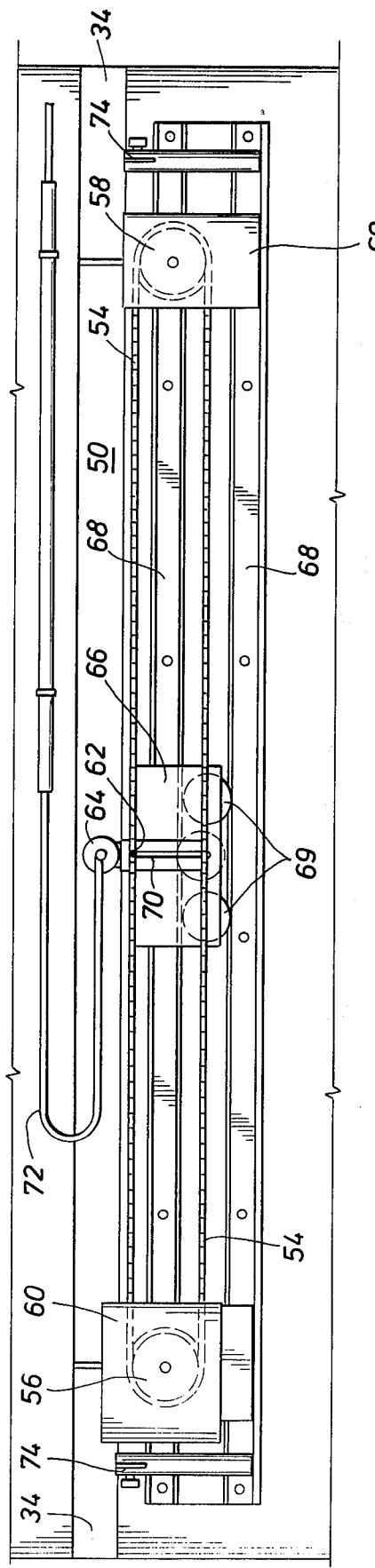
FIG. 2 is a pictorial top view of a suitable spray nozzle traverse mechanism.
Figure 3:
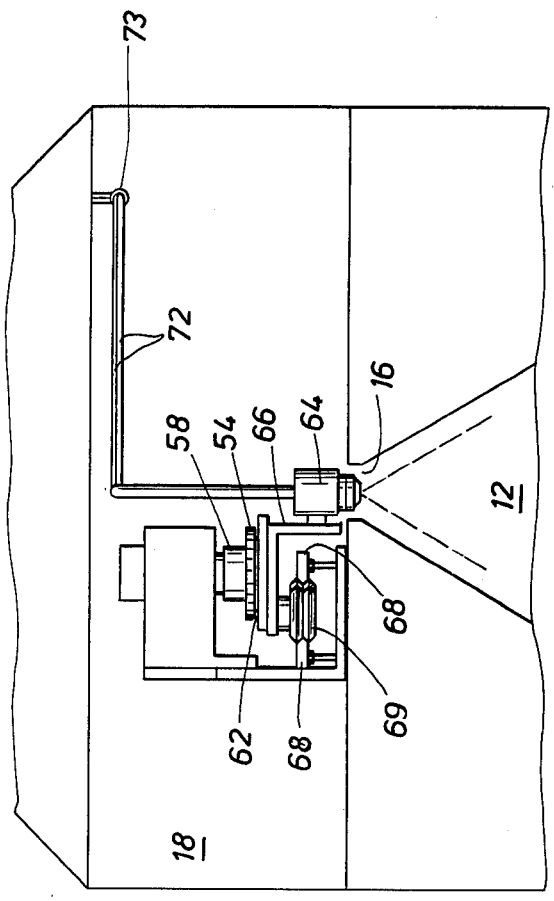
FIG. 3 is a pictorial end view of a suitable spray nozzle traverse mechanism.

Referring now to FIGS. 2 and 3, there is depicted pictorial top and end views illustrating a spray nozzle traverse mechanism in accordance with a preferred embodiment of the present invention. The traverse mechanism is located in the space 18 provided in spray booth assembly 10 in order to maintain the components substantially at ambient temperature. Chain 54 is mounted on drive sprockets 56 and 58 for continuous rotation within space 18. Although a variety of chain designs may be used, a preferred embodiment uses a stainless steel wire coated with polyurethane to form a chain which operates without lubrication. Sprocket 56 is driven by drive motor and gear box assembly 60, many varieties of which are commercially available. An electrical cable assembly (not shown) connects drive motor and gear box assembly 60 to an available power supply.

Spray nozzle 64 is mounted on nozzle support 66 and is interconnected with a plurality of material supply lines 72 for receiving pressurized air and solutions of a material to be sprayed. Supply lines 72 are sized to accommodate the traverse distance and are preferably flexible lines for accommodating such movement. Supply lines 72 are supported by support tube 73 and connected to external material sources (not shown) Typically, at least one supply line 72 is provided with an atomizing gas, generally air, from a pressure regulated source. Another supply line 72 is provided with a solution of chemicals which react to form the desired film and is provided from a pressurized external tank and to a variety of flow controllers. Such apparatus is conventional and is not depicted herein.

Nozzle support 66 may be mounted on traverse support 68 mounted within spray booth assembly 10. Traverse support 68 is provided to maintain alignment of nozzle 64 throughout the traverse. Nozzle support 66 further includes guide slot forming means 70 which may be defined by an indentation in nozzle support 66 or by projections from nozzle support 66.

Nozzle 64 depends downward from nozzle support 66 and projects through entrance slot 16 (see FIG. 1) for projecting a spray into the spray chamber 12. It is preferable for the nozzle 64 air cap tip (see FIGS. 3, 5A and 5B) to extend a small distance into spray chamber 12 through entrance slot 16 (see FIG. 1).

Chain 54 is provided with drive pin 62 for reciprocating nozzle support 66 within traverse space 18. As pin 62 engages either of sprockets 58 or 54, the pin moves within slot 70, thereby maintaining engagement with slot 70 throughout the rotation of pin 62, causing reciprocation of nozzle support 66. As drive pin 62 engages sprocket 58 or 54, nozzle support 66 begins to accelerate for the traverse in the opposite direction. The forces required for this acceleration may be substantial and can lead to deformation or breakage of drive pin 62.

Accordingly, energy storing mechanisms 74 may be provided at each end of the traverse to store the energy of nozzle support 66 during deceleration and return the energy during subsequent acceleration. A resilient member, such as spring steel, may be provided for mechanism 74. Thus, as drive pin 62 engages sprocket 58 or 54, nozzle support 66 engages spring member 74 and begins to deflect spring member 74. Once drive pin 62 passes the maximum point of traverse and begins to return in the opposite direction, spring member 74 returns to its initial position, returning the stored energy to nozzle support 66. Acceleration forces are thus provided by spring member 74 rather than drive pin 62.

Typically, the linear portion of the traverse is located over substrate 50 and the reversing portion occurs at least partially over end pans 34 and 36. In a typical installation, nozzle 64 is located about 10 inches above the upper surface of substrate 50. End pans 34 and 36 are generally at the same elevation as the upper surface of substrate 50. The clearance between the edge of end pans 34 and 36 and the edge of substrate 50 is preferably minimized and less than ⅛ inch to prevent air currents around the edges of substrate 50 from moving the chemical reaction away from the surface of substrate 50.

Referring now to FIGS. 4A and 4B, there is depicted in schematic form cross-sectional views of spray booth assemblies for forming thin films of tin oxide ($SnO_x$) and cadmium sulfide (CdS), respectively. The subject booth assemblies illustrate application of the above booth design principles to specific film forming operations.

Referring first to FIG. 4A, there is shown a spray booth effective in forming high quality films produced from a gas phase reaction, such as a film of transparent highly conductive tin oxide ($SnO_x$). Air cap 76 of the spray nozzle is located adjacent convection current suppression slot 92 to direct spray 96 downwardly toward the substrate surface. The chemical reactions herein described occur on the surface of a heated substrate. For $SnO_x$, the substrate is generally heated to a temperature in the range of 460°–500° C. The temperature difference between the surface of the substrate and spray traversing space 18 can give rise to thermal convection currents in the spray chamber defined by interior walls 94. The exhaust system hereinabove described is adjusted to admit sufficient air through slot 92 to suppress these convection currents.

In addition to convection currents, the atomized spray 96 itself could act to establish differential pressure zones within a spray volume. Accordingly, an important feature of the subject spray booth design is to maintain the spray chamber volume defined by walls 94 to the minimum volume required to accommodate the selected spray 96 configuration. Thus, walls 94 cooperate with the spray defined by air cap 76 wherein the spray configuration conforms as closely as possible to the interior wall 94 design.

In a gas phase reaction, such as occurs in $SnO_x$ formation, it is desirable to maintain the spray in close proximity to the surface of substrate 102 for vapor formation and reaction to occur. This requirement may not be met if the full convection current suppression air flow must pass between roof area 100 and the surface or substrate 102. Accordingly, air flow control slots 98 are provided which permit a portion of the suppression air flow to be exhausted above roof portion 100. Laminar air flow along the interior walls 94 permits this to be done without affecting spray cone 96.

For $SnO_x$ formation, spray configuration 96 is preferably formed by the air cap depicted in FIG. 5A. When a normal atomizing air cap is used, a cone of spray is formed which flows generally uniformly in all directions upon impact with a substrate surface. That portion of the flow which carries the spray beneath roof area 100 forms high quality $SnO_x$. That portion of the spray which is generally transverse to movement of the substrate forms $SnO_x$ with undesirable characteristics, e.g., high resistance and hazy.

Air cap 76 is preferably provided for forming the $SnO_x$ spray configuration 96. Air cap body 78 defines central outlet 80 and side outlets 82. Side outlets 82 are aligned transverse to the movement of the substrate and are preferably oriented at an angle of about $\theta = 16°$ with respect to central outlet 80. Side outlets 82 provide air cones which force the liquid spray to flow beneath roof area 100 rather than transversely across an underlying substrate. The projection angle $\theta$ for outlet 82 is selected to approximate the spray cone angle so that a substantially vertical air curtain is formed. Spray configuration 96 (FIG. 3) is, thus, generally cone shaped in the direction promoting the flow of sprayed material beneath roof portions 100 and is suppressed in a direction generally transverse to the movement of a substrate passing through the spray chamber.

The spray arriving beneath roof area 100 forms a vapor above a heated substrate which, in one embodiment, reacts to form a film of $SnO_x$ on the exposed surface of the substrate. Reaction products and unreacted materials are moved across the substrate surface and into exhaust ducts 124 for delivery to the external exhaust piping and filter systems. Exhaust lip 128 is provided to assist in diverting the incident air flow from above the surface of the substrate and into exhaust ducts 124. An upwardly projecting portion of exhaust lip 128 assists in obtaining a smooth flow of air from above the surface of substrate 102 to minimize uncontrolled and turbulent flow conditions.

Referring now to FIG. 4B, there is depicted a spray booth suitable for forming a thin film on a heated substrate from a liquid phase reaction. Air cap 84 is provided within convection current suppression slot 105 for forming spray configuration 108. In a liquid phase reaction, a wide spray is desirable to reduce the unit area heat loading induced by the liquid drops reaching the surface prior to the chemical reaction occurring. Again, sufficient air is introduced through convection current suppression slot 105 to partially suppress thermal currents which could act to maintain spray droplets in suspension. Interior walls 106 are now configured to the fan shaped spray 108. A roof portion is not required in a liquid phase reaction and, in fact, it is desirable to remove reaction products and unreacted products from above the surface as soon as possible. Accordingly, interior walls 106 terminate at the entrance to exhaust ducts 124.

The fan spray configuration 108, which is especially suitable for CdS film formation, may be formed by air cap 84 depicted in FIG. 5B. Air cap 84 has body portion 85 which defines central air outlet 86 for atomizing the sprayed liquid. Outlet 88 injects air against the emerging stream from fluid outlet 81 to form a fan-like spray configuration, i.e., a spray configuration having a narrow uniform width in relation to the longitudinal axis of the spray. The resulting spray envelope 108 is oriented with the longitudinal axis parallel to the direction of substrate movement. The narrow width of the spray reduces the spray dwell time over substrate area portions so that a given quantity of sprayed material can react completely prior to adding additional materials. It is expected that the fan shaped spray will significantly increase the film-forming capability of a single booth by permitting larger volumes of solution to be sprayed.

Fan-forming air outlet 88 is directed toward the spray cone formed by atomizing outlet 86 at an angle $\phi$, which may be the maximum angle permitted by air cap body 85. The resulting spray envelope 108 (FIG. 4B) is the desired fan shape. The air curtains thus formed act to drive the sprayed particles onto the surface of the substrate where the desired reaction can occur.

Again, exhaust lip 110 is provided for smoothly moving the air flow into exhaust entrance assembly 109. Airflow control slots are not necessary in the CdS spray booth since it is desired to quickly remove reaction products and reacted spray from above the surface of the substrate and into exhaust system 124.

It should be noted that air caps 76 and 84 depicted in FIGS. 5A and 5B, respectively, are generally modified designs of commercially available air caps. Air cap 76 is formed by drilling air holes 82 to a diameter of 0.031 inches at an angle of 16° from the vertical through air cap body 78. Atomizing air opening 80 is preferably 0.064 inches in diameter. Air cap 84 may be formed by providing 0.040 inch diameter air slots at an angle $\phi = 41°$ in air cap body 85 having an atomizing opening 86.

Air caps 76 and 84 are preferably formed from corrosion and erosion resistant materials, such as titanium or 316 stainless steel. It has been found desirable to institute certain quality checks on commercial nozzles to ensure that the incipient spray cones are reasonably uniform prior to being shaped by air outlets 82 and 88, FIGS. 5A and 5B. The concentricity of liquid tip 81 within atomizing opening 80 and 86 is at least visually checked. At least some air passage 80 and 86 should be present around the entire periphery of liquid tip 81. It has also been found desirable for liquid tip 81 to project slightly below air cap bodies 76 and 85 to minimize spray residue buildup about the periphery of atomizing openings 80 and 86.

An important feature herein is the control of air flow within the spray chamber and adjacent the film-forming surface. Referring first to FIG. 4A, an air flow control scheme is depicted which is suitable for gas phase reactions forming high quality films such as $SnO_x$. An exhaust fan (not shown) connects with exhaust ducts 124 to induce air flow A through nozzle slot 92. Air flow A is selected to suppress convection currents induced by a heated substrate. However, it is desirable for air flow C beneath roof 100 to be only the air flow required to remove reaction products from the volume beneath roof 100.

Air flow control slot 98 is provided to divert air flow B from above roof 100. The relative amounts of air flow B and C may be varied by adjusting the proximity of exhaust lip 128 to the edge of roof area 100. This proximity adjustment may conveniently be done by spacer elements 114 on the end pans located on the sides of the spray booth assembly (pans 34 and 36 in FIG. 1).

An ancillary advantage of the preferred embodiment is obtained by mixing the relatively cool diverted air flow B with the heated air flow C from roof area 100. At the mixing region D, substantial deposition of reaction products and unreacted spray is expected to occur on exhaust entrance assembly 129. This local deposition should act to reduce the frequency for cleaning the spray system internal components to increase the system duty cycle.

Referring to FIG. 4B, there is depicted an air flow control system for forming films such as CdS from liquid phase reactions. In this instance the desired reaction occurs within close proximity to the projected spray footprint. Thus, it is desirable to remove sprayed material outside of the desired reaction zone. This is obtained by maintaining full air flow through the spray chamber to exhaust flow F.

An exhaust system (not shown) provides sufficient air flow E through nozzle slot 105 to suppress convection currents. Air flow F is controlled by exit lip 111 to maintain a minimum volume spray chamber without impeding air flow through exhaust system 124. Reaction products and undeposited spray materials are promptly removed from the spray chamber.

Another important feature of the present apparatus is ability to remove spray booth components for cleaning. In a continuous production facility, spray booth cleaning is desirably carried out with minimum effects on the overall film-forming operations. Thus, the spray booths are designed to facilitate removal and replacement of components which require frequent cleaning.

FIGS. 4A and 4B illustrate various cleanability features. Exhaust entrance assemblies 129 and 109 are expected to accumulate considerable condensate from the spray materials and from reaction products of the film forming process. These exhaust entrance assemblies 129 and 109 are attached to exhaust assemblies 122 and 107 via slidable mountings 127 and 113 and can be removed for cleaning without affecting more than a single substrate.

Other areas of the spray booth are also in direct contact with portions of the spray and will accumulate residue, but at a lesser rate than exhaust entrance assemblies 129 and 109. Thus, exhaust duct assemblies 122 and 107 are removable from the basic spray booth. Exhaust duct assemblies 122 and 107 have lip portions 130 and 111 which act to align exhaust duct assemblies 122 and 107 and to provide removable surfaces at areas of accelerating air flow where residue accumulation is expected.

In the booth assembly, FIG. 4A, provided with roof area 100, roof 100 is in intimate contact with gaseous materials forming the films on the underlying substrate. Thus, roof section 100 is removable from adjacent air slot 98. In a preferred embodiment, support member 101 slidably engages tracks 99 for maintaining the desired spacing forming air slot 98.

During operation of the spray line, booth 10 is supported on support blocks 38, as shown in FIG. 1. The sides of the booth are sealed by foam silicone sheet backings on end plates 44 and support blocks 38.

To remove an exhaust entrance assembly 29, attachment means 43 is actuated to remove the weight of the booth from support blocks 38. Support blocks 38 are removed and exhaust entrance assembly 29 may be replaced with a cleaned assembly 29. Alternatively, the entire exhaust assembly 22 may be replaced with a cleaned assembly 22.

When roof section 32 is to be cleaned, end plate 44 is also removed. Roof section 32 can then be quickly replaced. When end plates 44 and support blocks 38 are removed, end pans 34 and 36 can be replaced.

A cover plate (not shown) may be used to cover substrate 50 when support blocks 38 and end plates 44 are removed. With a suitable cover plate installed, line operation could continue without debris falling onto substrate 50. The entire booth assembly 10 can then be removed for cleaning by removing exhaust ducts 22 and lifting booth 10 with support beam 42 from above a cover plate. Removal and replacement could also be affected without a cover plate, but the substrate sheets 50 exposed during the operations would possibly have defective films and/or substrate breakage.

It is thus apparent that the spray booth designs hereinabove described act to provide a controlled environment for controlling the characteristics of the sprayed material from the time the liquid is atomized at the air cap until residual spray and reaction by-products are removed by the exhaust system. A minimum volume spray booth minimizes stagnant areas where turbulence may be created; air injection is provided in an amount sufficient to suppress convection currents from above the heated glass substrate; and exhaust flow above the substrate surface is controlled as a function of the chemical reaction which occurs to form the desired film. Under these stable and predictable conditions, system operating parameters can be set to provide predictable film characteristics and qualities, obtaining superior films of $SnO_x$ having a high degree of optical clarity and high electrical conductivity and films of CdS having superior uniformity and freedom from surface anomalies.

It is also apparent that the present invention is one well adapted to attain all of the objects and advantages which will become obvious and inherent from a description of the apparatus itself. It will be understood that certain combinations and subcombinations are of utility and may be employed without reference to other features and subcombinations. This is contemplated by and is within the scope of the present invention.

As many possible embodiments may be made of this invention without departing from the spirit or scope thereof, it is to be understood that all matters hereinabove set forth or shown in the accompanying drawings are to be interpreted as illustrative and not in any limiting sense.

What is claimed is:

1. Spray apparatus for forming thin films of selected materials on a hot moving substrate, comprising:
   a spray nozzle for forming a selected spray configuration having an apex adjacent said nozzle;
   gas injection means adjacent said spray nozzle for forming a fan-shaped spray envelope having its longitudinal axis substantially parallel to movement of said substrate;
   a first interior wall transverse to movement of said substrate substantially conforming to an upstream portion of said selected spray configuration;
   a second interior wall transverse to movement of said substrate substantially conforming to a downstream portion of said selected spray configuration;
   a spray entrance slot defined by said first and second interior walls;
   means for introducing ambient air flow through said spray entrance slot in an amount effective to suppress convection currents above said hot substrate between said first and second interior walls;
   said first and second interior walls defining an interior spray chamber conforming to said selected spray configuration to effectively suppress spray-induced turbulence within said spray chamber; and
   exhaust ducting for receiving said ambient air flow.

2. Apparatus as defined in claim 1, wherein said gas injection means comprises at least two side openings within said spray nozzle for injecting gas for forming said spray envelope.

3. Apparatus as defined in claim 1, wherein said first and second interior walls define a spray entrance slot substantially adjacent said apex of said selected spray configuration.

4. A spray process for forming thin films of selected materials on a hot moving substrate, comprising:
   forming from an atomized liquid a selected spray configuration having an apex above said substrate;
   injecting a gas adjacent said apex for forming a fan-shaped spray configuration having its longitudinal axis substantially parallel to movement of said hot substrate;
   forming a first interior wall transverse to movement of said substrate substantially conforming to an upstream portion of said selected spray configuration;
   forming a second interior wall transverse to movement of said substrate substantially conforming to a downstream portion of said selected spray configuration;
   forming an interior spray chamber defined by said first and second interior walls having a minimum volume for accommodating said selected spray configuration; a spray entrance slot defined by said first and second interior walls; has been entered.
   introducing ambient air flow through said spray entrance slot to suppress convection currents above said hot substrate and between said first and second interior walls; and
   exhausting said ambient air flow from above said hot substrate.

5. A process as defined in claim 4, further comprising:

positioned said apex of said selected spray configuration substantially within a spray entrance slot defined by said first and second interior walls.

6. Spray apparatus for forming thin films of selected materials on a hot moving substrate, comprising:
a spray nozzle adapted for forming a selected spray configuration;
a spray chamber defining an interior wall configuration transverse to movement of said substrate;
means for introducing atmospheric flow through said spray chamber in an amount effective to suppress convection currents above said hot substrate;
exhaust ducting extending transverse to movement of said substrate for receiving said atmospheric flow; and
an intermediate slot defined by said spray chamber interior all for exhausting a portion of said atmospheric flow at an elevation remote from said substrate.

7. Spray apparatus as described in claim 6, wherein said spray nozzle further includes an air cap having a central opening for atomizing a selected liquid and at least two side openings for injecting air in a pattern effective to form said selected spray configuration.

8. Spray apparatus as described in claim 6, wherein said spray chamber further defines a roof section formed at an elevation above said substrate in cooperative relationship with said intermediate slot to maintain said atmospheric flow within a selected velocity range over said substrate.

9. Spray apparatus as described in claim 8, wherein said selected velocity range provides a dwell time beneath said roof section for a film forming reaction of sprayed solutions to occur.

10. Spray apparatus as described in claim 8, wherein said roof section is separately removable from within said spray chamber.

11. Spray apparatus as described in claim 6, wherein said exhaust ducting includes:
a first removable lip portion adjacent said substrate for directing flow from above said substrate into vertical portions of said exhaust ducting,
said vertical portion being removably connected with said first lip portion and further including a second lip portion cooperating with said first lip to define an entrance to said exhaust ducting.

12. Spray apparatus as described in claim 11, wherein said vertical portions of said exhaust ducting slidably engage exterior portions of said spray chamber.

13. A spray booth, comprising:
interior wall portions defining a spray chamber contoured to substantially conform to a preselected spray cone configuration and further defining an entrance slot to said spray chamber for admitting spray and ambient air to said chamber;
exterior wall portions supporting said interior wall portions and defining an open volume admitting ambient air;
vertical exhaust ducts adjacent said exterior wall portions;
an intermediate air slot defined by said interior wall portions and separating said spray chamber into an upper portion and a roof portion; and
said roof portion being adjacent said vertical exhaust ducts.

14. Apparatus as defined in claim 13, further comprising:
exhaust entrance assemblies slidably engaging said vertical exhaust ducts at a location adjacent a lower portion of said spray chamber for directing materials from said spray chamber to said vertical ducts.

15. A spray booth according to claim 13, wherein said intermediate slot intersects said exhaust entrance assembly at a location effective to cool materials received from beneath said roof section and condense said materials on said exhaust entrance assembly.

16. A spray booth according to claim 13, wherein said vertical exhaust duct further includes a lip portion overlying areas of said interior wall where portions of said spray enter said vertical exhaust ducts.

17. Spray apparatus for forming thin films of selected materials on a hot moving substrate, comprising:
a spray nozzle adapted for spraying a liquid on said substrate;
gas injection means adjacent said spray nozzle for forming an fan-shaped spray envelope having its longitudinal axis substantially parallel to movement of said substrate;
a spray chamber having a minimum volume for accommodating said fan-shaped spray envelope and defining an interior wall configuration transverse to movement of said substrate substantially conforming to said fan-shaped spray envelope;
means for introducing atmospheric flow through said spray chamber in an amount effective to suppress convection currents above said hot substrate; and
exhaust ducting extending transverse to movement of said substrate for receiving said atmospheric flow.

18. Apparatus as defined in claim 17, said exhaust ducting further having flow receiving areas arranged to establish a generally uniform distribution of said atmospheric flow across said substrate.

19. Apparatus as defined in claim 17, wherein said gas injection means comprises at least two side openings within said spray nozzle for injecting gas for forming said spray envelope.

20. Apparatus as defined in claim 17, said interior wall configuration of said spray chamber defining a spray entrance slot substantially adjacent the tip of said spray nozzle.

21. Spray apparatus as defined in claim 17, wherein said means for introducing atmospheric flow through said spray chamber includes an entrance slot adjacent said spray nozzle.

22. Spray apparatus as defined in claim 17, further including means for controlling the velocity of said atmospheric flow over said substrate, comprising:
an exit lip movably adjustable with respect to said interior wall configuration for removing spray components from above said substrate within a preselected time.

23. A spray process for forming thin films of selected materials on a hot moving substrate, comprising:
forming from an atomized liquid a selected spray configuration within a spray chamber;
projecting said spray toward said hot substrate;
introducing atmospheric flow about said spray in an amount effective to suppress convection currents above said hot substrate;
removing a first portion of said atmospheric flow through an intermediate slot within said spray chamber at an elevation remote from said substrate; and exhausting a second portion of said atmospheric flow from above said substrate.

24. A process as defined in claim 23, further comprising:
   forming a roof section above said substrate for maintaining said second portion of said atmospheric flow within a selected velocity range over said substrate.

25. A process as defined in claim 24, further combining:
   recombining said first and second portions of said atmospheric flow for condensing materials on a selected surface.

* * * * *

UNITED STATES PATENT AND TRADEMARK OFFICE
CERTIFICATE OF CORRECTION

PATENT NO. : 4,414,252
DATED : November 8, 1983
INVENTOR(S) : Curtis M. Lampkin

It is certified that error appears in the above-identified patent and that said Letters Patent is hereby corrected as shown below:

Claim 4, Col. 12, line 61, "first and second interior walls; has been entered." should read -- first and second interior walls, --

Signed and Sealed this

Eighth Day of May 1984

[SEAL]

Attest:

GERALD J. MOSSINGHOFF

Attesting Officer

Commissioner of Patents and Trademarks